(No Model.)
J. TEAR.
FRUIT GATHERER.
No. 263,993. Patented Sept. 5, 1882.
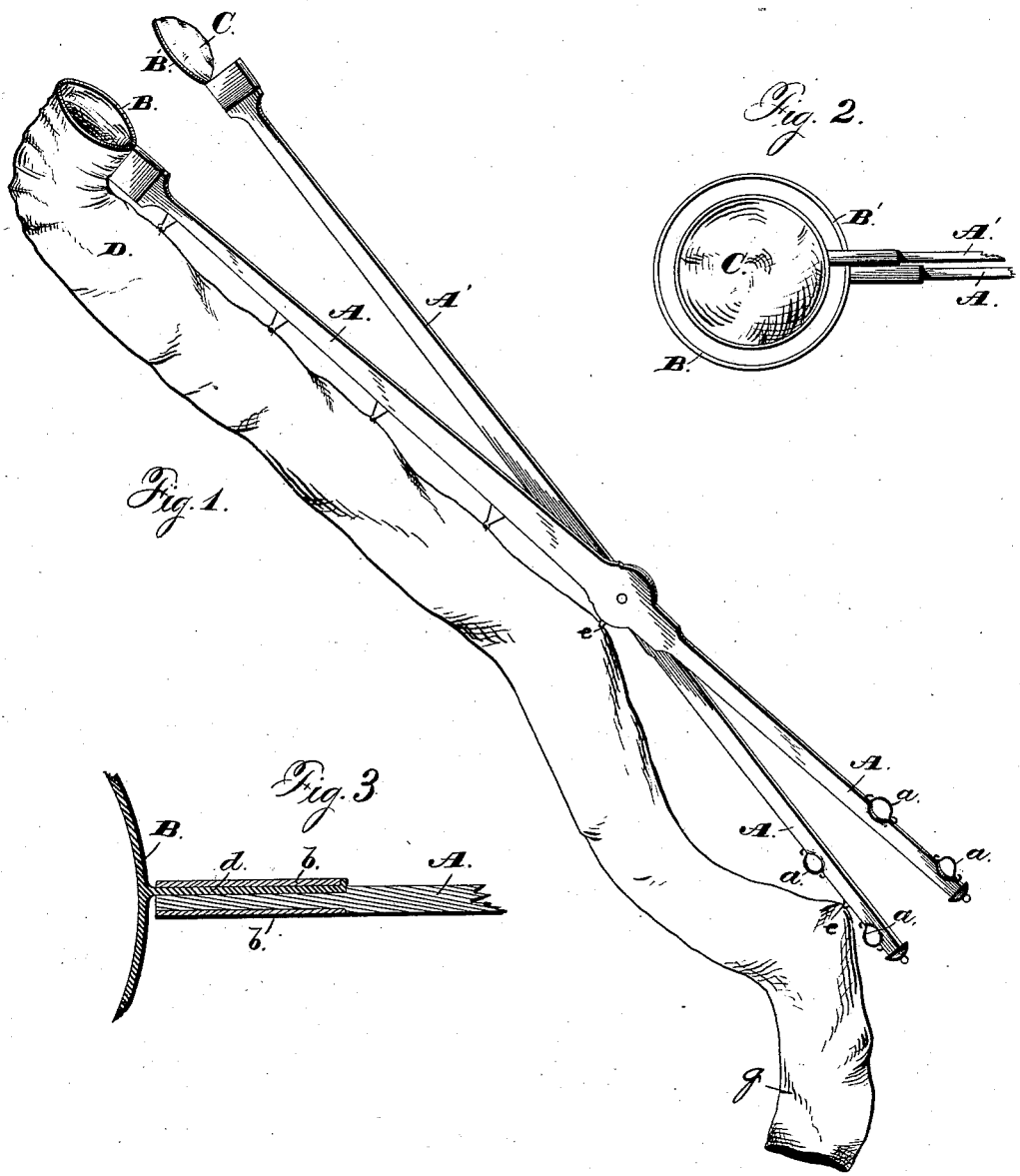
WITNESSES
Jas. E. Hutchinson.
S. G. Nottingham
INVENTOR
John Tear.
By H. A. Seymour.
Attorney

UNITED STATES PATENT OFFICE.

JOHN TEAR, OF GENEVA, ILLINOIS.

FRUIT-GATHERER.

SPECIFICATION forming part of Letters Patent No. 263,993, dated September 5, 1882.

Application filed July 5, 1882. (No model.)

*To all whom it may concern:*

Be it known that I, JOHN TEAR, of Geneva, in the county of Kane and State of Illinois, have invented certain new and useful Improvements in Fruit-Gatherers; and I do hereby declare the following to be a full, clear, and exact description of the invention, such as will enable others skilled in the art to which it pertains to make and use it, reference being had to the accompanying drawings, which form part of this specification.

My invention relates to an improvement in fruit-gatherers, the object of the same being to produce a cheap, simple, and durable device for gathering fruit from the outer or distant branches of trees and conducting it to a basket or bag suspended from the arm of the operator or from the tree without the danger of accidents or damaging the fruit.

With these ends in view my invention consists in certain details in construction and combination of parts, as will be more fully explained, and pointed out in the claims.

In the accompanying drawings, Figure 1 is a perspective view of my improved device. Fig. 2 is a plan view with the handles cut away; and Fig. 3 is a vertical sectional view, showing the manner of attaching the conveyer and pads to the handles.

A and A' represent the handles, made of any desired material and dimensions, but of sufficient strength to withstand the shocks liable to occur at any time during the operation of gathering fruit. These handles are rounded or cut away at their free ends for the accommodation of the fingers of the operator, and are also provided with the metal loops $a$, adapted to prevent the hand from slipping, and also to give better purchase in opening, and prevent the device from accidentally falling to the ground. As ordinarily used, the handles A and A' are pivoted together a little to one side of the center, nearer the outer or free ends, so as to allow the upper or conveyer end to open wider to receive the fruit with the same amount of movement of the fingers that it would if pivoted in the center; but said pivot may be moved to any other point on said handles as occasion may require.

The upper ends of the levers A and A' are each provided with the collars $b$, adapted to receive and retain the shanks $d$ of the conveyer-ring B and cushion-ring B'. The conveyer-ring B is of greater diameter than the ring B', and the shank of the said ring is fitted on the upper surface of the lever A, under the collar $b$, while the shank of the ring B is fitted to the under surface of the lever A', so as to allow the cushion C to slightly enter the mouth of the conveyer D for the purpose of firmly grasping the fruit, and also to prevent the fruit from being bruised or damaged by contact with the rings B and B'. The outer ends of the shanks $d$ are turned up, so as to prevent the rings B and B' from being withdrawn or working loose.

D is the conveyer, made of cloth or any other suitable flexible material, the upper end of which is attached to the ring B, while the lower end of the same is free, thereby allowing it to be attached to a basket or bag suspended in the tree and conduct the fruit thereto without injury or handling. The upper end of the conveyer D is secured around the ring B, with suitable padding interposed, if desired, between the ring and cloth, to prevent the fruit being bruised by contact with the said ring, while the remaining portion of the said conveyer, below its mouth, is suspended to the under side of the lever A to or near the point of connection of the two levers A and A', where it sags down until attached to the lever A' between the loops $a$, the end $g$ being continued down therefrom any desired length to suit the convenience of the operator.

The cushion C, of smaller diameter than the ring B, is secured to the ring B' in any desired manner, and is adapted to force the fruit into the mouth of the conveyer and detach it from the tree without bruising or damaging it. After the fruit is detached from the tree it falls down the conveyer and rests in the "sagging" portion between the points of attachment $e$ $e'$ on the handles A and A', the portion of the bag behind it collapsing, which prevents the next one from striking the preceding one with enough force to damage it. When a number of apples or pears or other fruit, as the case may be, have collected in the sagging portion of the conveyer, the machine is brought to a perpendicular position and the sag is straightened by the upper portion being raised, which causes the fruit contained in the conveyer to fall in the basket or bag, as desired.

By the use of my improved device I am enabled to gather the fruit on the outer or remote branches of trees without exposing or in any manner risking myself to numerous accidents attendant upon the old manner of gathering fruit.

By simply securing removable cutters or jaws on the outer surface of the rings B and B' to cut stems, I can gather grapes and other similar fruit without injury to the same.

I am aware that fruit-gatherers have been constructed of pivoted levers having the open mouth of a bag or receptacle secured to the adjacent ends of both levers, and hence I make no claim to such construction and arrangement of parts.

Having fully described my invention, what I claim as new, and desire to secure by Letters Patent, is—

The combination, with the handles A A', of the ring B', having a cushion, C, secured thereto, the ring B, and conveyer D, the open end of the latter being secured to the ring B, and its lower end secured by a loop to one of the handles, substantially as set forth.

In testimony that I claim the foregoing I have hereunto set my hand this 24th day of June, 1882.

JOHN TEAR.

Witnesses:
N. S. CARLISLE,
THOS. MEREDITH, Jr.